US012693958B2

(12) United States Patent
Jansa et al.

(10) Patent No.: US 12,693,958 B2
(45) Date of Patent: Jul. 28, 2026

(54) APPLICATION LIFECYCLE MANAGEMENT

(71) Applicant: Schlumberger Technology Corporation, Sugar Land, TX (US)

(72) Inventors: Karl Jansa, Crawley (GB); Denis Nesterov, Houston, TX (US); Alexander Ovsyankin, Tananger (NO); Alexander Kulishkin, Tyumen (RU); Ahmed Adnan Aqrawi, Tananger (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 433 days.

(21) Appl. No.: 18/558,445

(22) PCT Filed: May 4, 2021

(86) PCT No.: PCT/RU2021/000188
§ 371 (c)(1),
(2) Date: Nov. 1, 2023

(87) PCT Pub. No.: WO2022/235172
PCT Pub. Date: Nov. 10, 2022

(65) Prior Publication Data
US 2024/0220391 A1 Jul. 4, 2024

(51) Int. Cl.
*G06F 11/3604* (2025.01)

(52) U.S. Cl.
CPC ................................ *G06F 11/3604* (2013.01)

(58) Field of Classification Search
None
See application file for complete search history.

(56) References Cited

U.S. PATENT DOCUMENTS 6,681,383 B1* 1/2004 Pastor ....................... G06F 8/30
717/126
8,677,315 B1* 3/2014 Anderson ................. G06F 8/60
717/124

(Continued)

FOREIGN PATENT DOCUMENTS

EP 3511824 A1 7/2019

OTHER PUBLICATIONS

M. Rodriguez, M. Piattini and C. Ebert, "Software Verification and Validation Technologies and Tools," in IEEE Software, vol. 36, No. 2, pp. 13-24, Mar.-Apr. 2019. (Year: 2019).*

(Continued)

*Primary Examiner* — Andrew M. Lyons
(74) *Attorney, Agent, or Firm* — Kyle R. Miiller

(57) ABSTRACT

A method implements application lifecycle management. A progress bar is presented, by an intake application executing on a processor, with state information of a developed application. Marketing information corresponding to the developed application is validated by the intake application. Licensing information is validated corresponding to the developed application. The developed application is validated with a deployment test corresponding to an application platform of the developed application. The developed application is validated with an acceptance test responsive to updating the state information with validation of the licensing information and validation with the deployment test. The validation information, the state information, and the progress bar are updated in response to validating the developed application with an acceptance test. A publication request is generated responsive to updating the state information with validation of the developed application with the acceptance test and validation of the marketing information.

20 Claims, 15 Drawing Sheets

(56) References Cited

U.S. PATENT DOCUMENTS

| | | | | |
|---|---|---|---|---|
| 8,949,770 | B2 * | 2/2015 | StClair | G06F 11/3688 |
| | | | | 717/126 |
| 10,977,395 | B1 * | 4/2021 | Bagate | G06Q 10/0637 |
| 2002/0103731 | A1 * | 8/2002 | Barnard | G06Q 40/02 |
| | | | | 705/34 |
| 2004/0143811 | A1 * | 7/2004 | Kaelicke | G06Q 10/10 |
| | | | | 717/104 |
| 2006/0179058 | A1 * | 8/2006 | Bram | G06F 21/629 |
| | | | | 707/999.009 |
| 2007/0106642 | A1 * | 5/2007 | Kovrigin | G06Q 10/06 |
| 2007/0226693 | A1 * | 9/2007 | Chatlain | G06Q 30/0185 |
| | | | | 717/126 |
| 2009/0300586 | A1 * | 12/2009 | Bernardini | G06F 8/61 |
| | | | | 717/126 |
| 2012/0204142 | A1 * | 8/2012 | Rubenstein | G06F 8/65 |
| | | | | 717/173 |
| 2014/0137071 | A1 * | 5/2014 | Wadhwani | G06F 8/70 |
| | | | | 717/101 |
| 2019/0155577 | A1 * | 5/2019 | Prabha | G06Q 10/0635 |
| 2019/0213893 | A1 * | 7/2019 | Roy | G06F 8/656 |
| 2020/0233662 | A1 * | 7/2020 | Bissonette | G06Q 10/0635 |

OTHER PUBLICATIONS

Search Report and Written Opinion of International Patent Application No. PCT/RU2021/000188 dated Feb. 1, 2022, 16 pages.
Jansa, K. et al., "Lifecycle Management in a Dynamic Open Ecosystem", TuDIGIP17, First EAGE Digitalization Conference and Exhibition, Vienna, Austria, 2020, 4 pages.

* cited by examiner

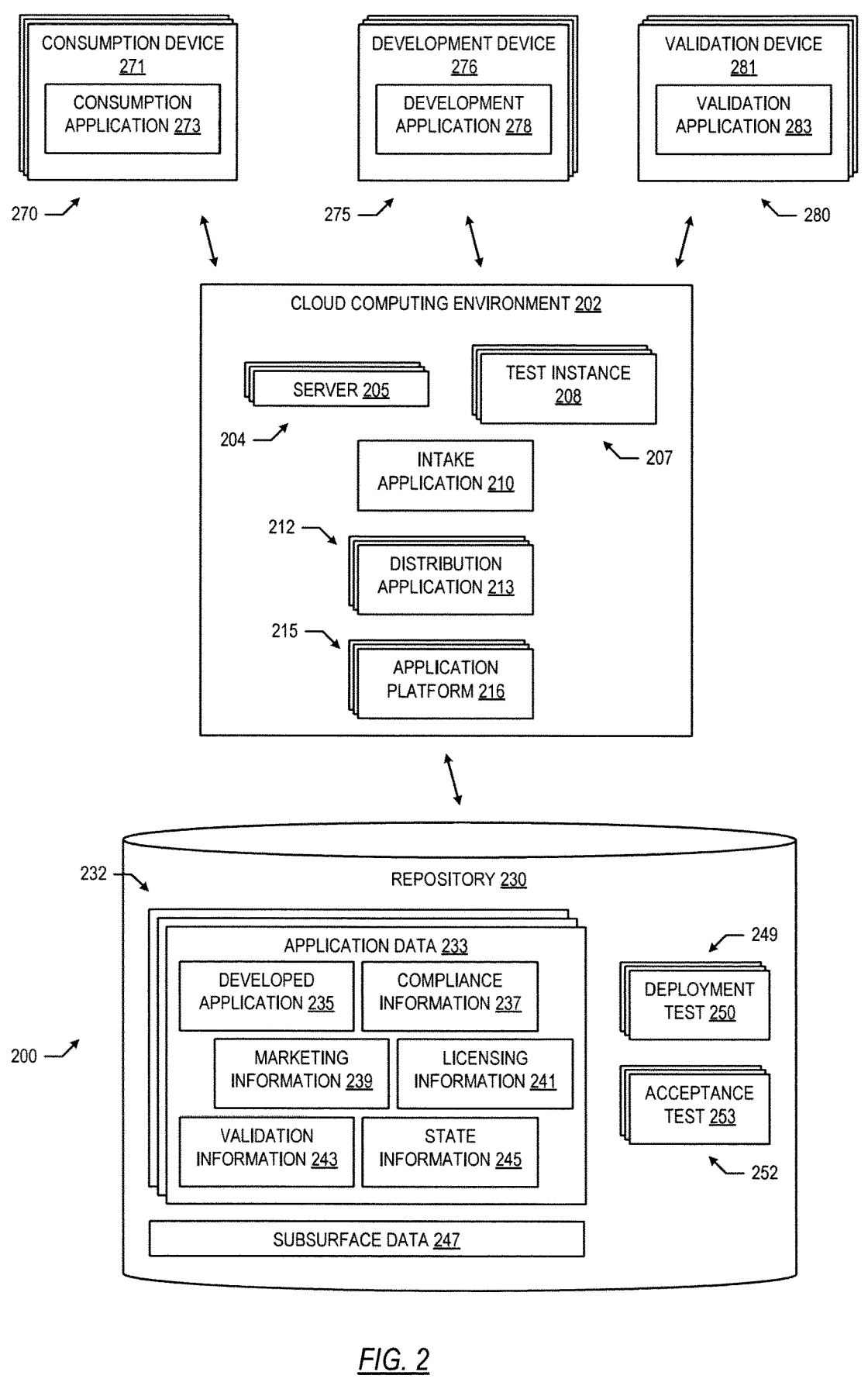

CONSUMPTION DEVICE
271

CONSUMPTION
APPLICATION 273

270

DEVELOPMENT DEVICE
276

DEVELOPMENT
APPLICATION 278

275

VALIDATION DEVICE
281

VALIDATION
APPLICATION 283

280

CLOUD COMPUTING ENVIRONMENT 202

SERVER 205

TEST INSTANCE
208

204

207

INTAKE
APPLICATION 210

212

DISTRIBUTION
APPLICATION 213

215

APPLICATION
PLATFORM 216

REPOSITORY 230

232

APPLICATION DATA 233

DEVELOPED
APPLICATION 235

COMPLIANCE
INFORMATION 237

MARKETING
INFORMATION 239

LICENSING
INFORMATION 241

VALIDATION
INFORMATION 243

STATE
INFORMATION 245

SUBSURFACE DATA 247

249

DEPLOYMENT
TEST 250

ACCEPTANCE
TEST 253

252

200

_FIG. 2_

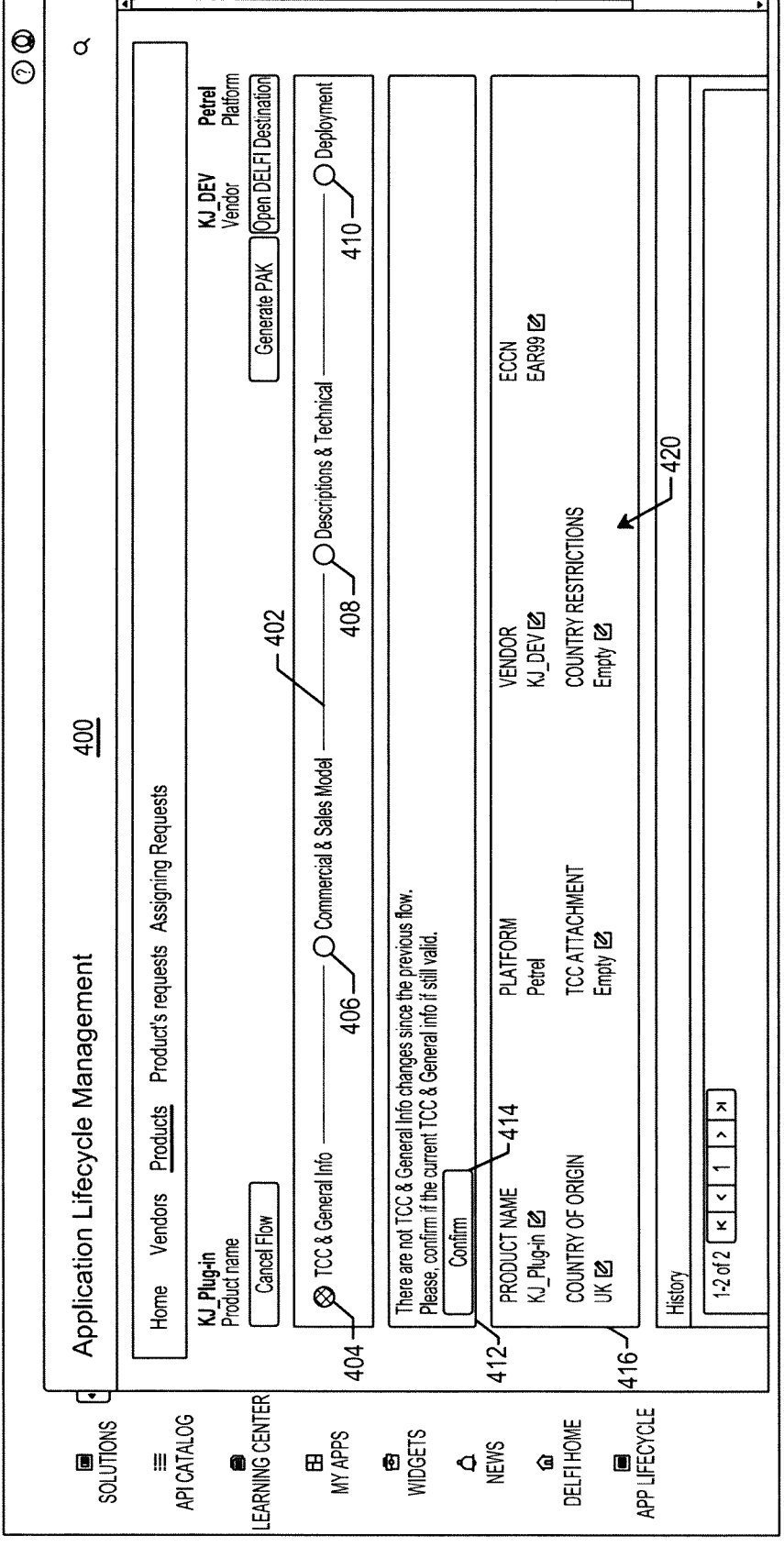
*FIG. 4.1*

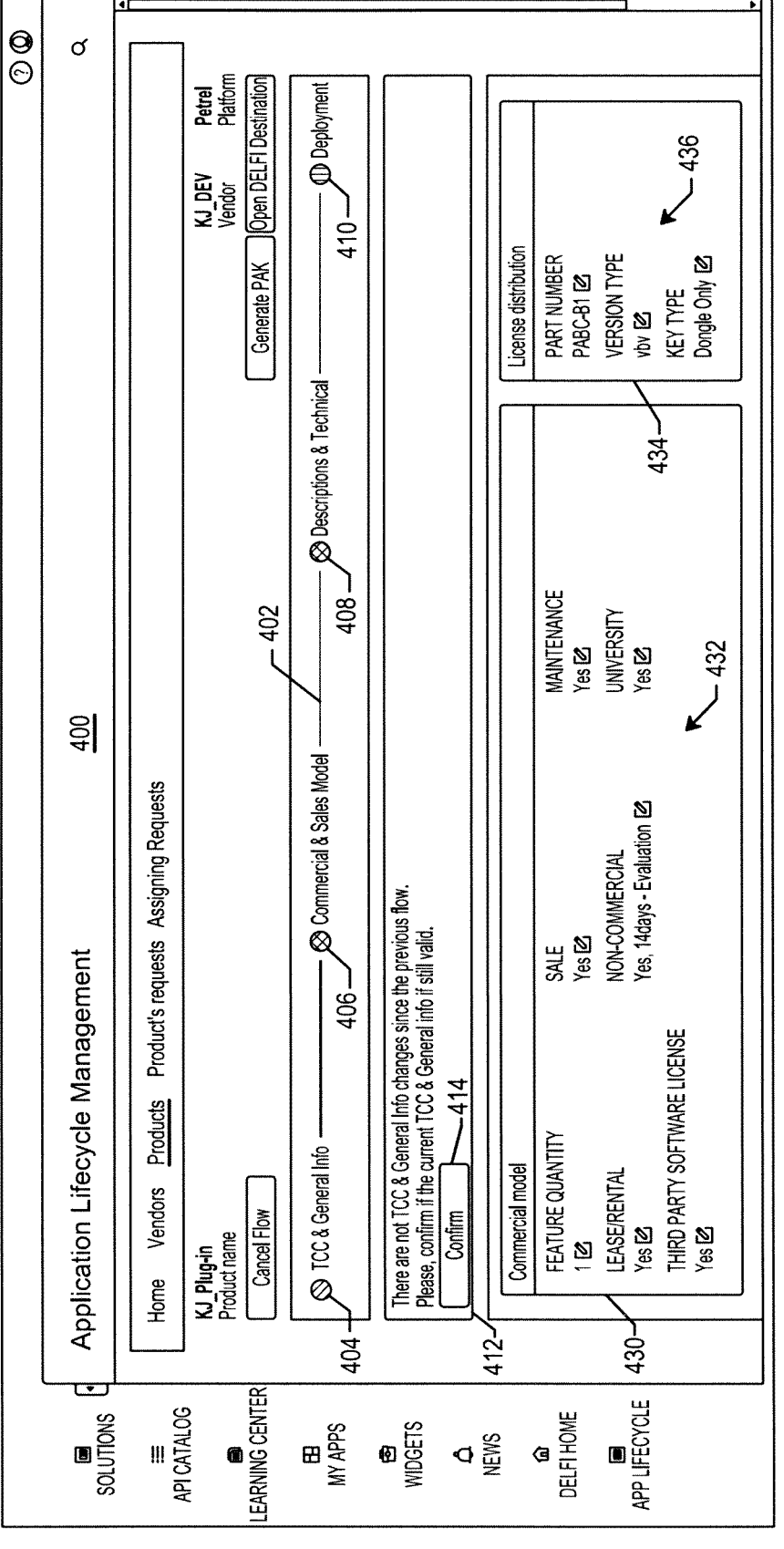
*FIG. 4.2*

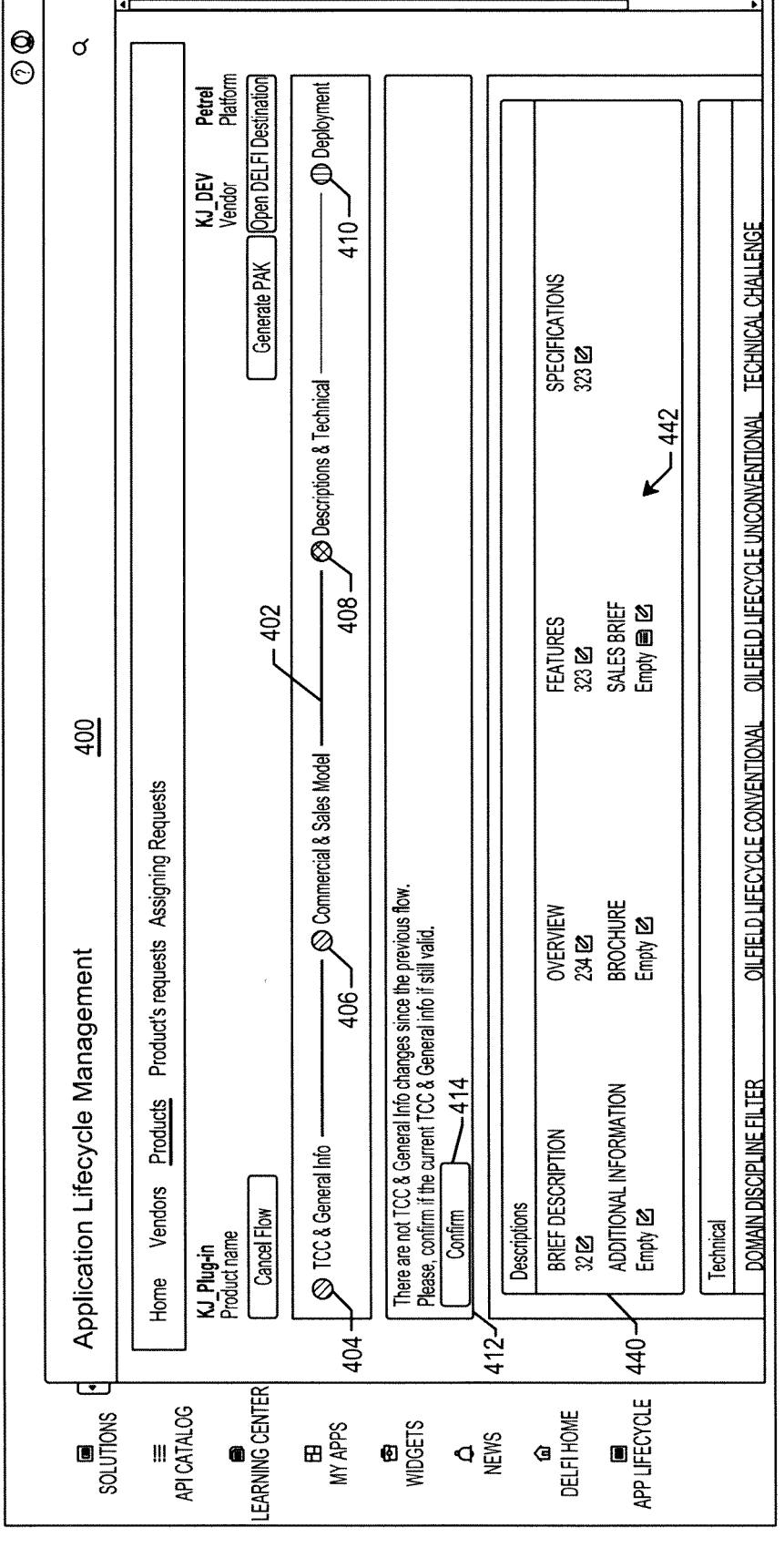
*FIG. 4.3*

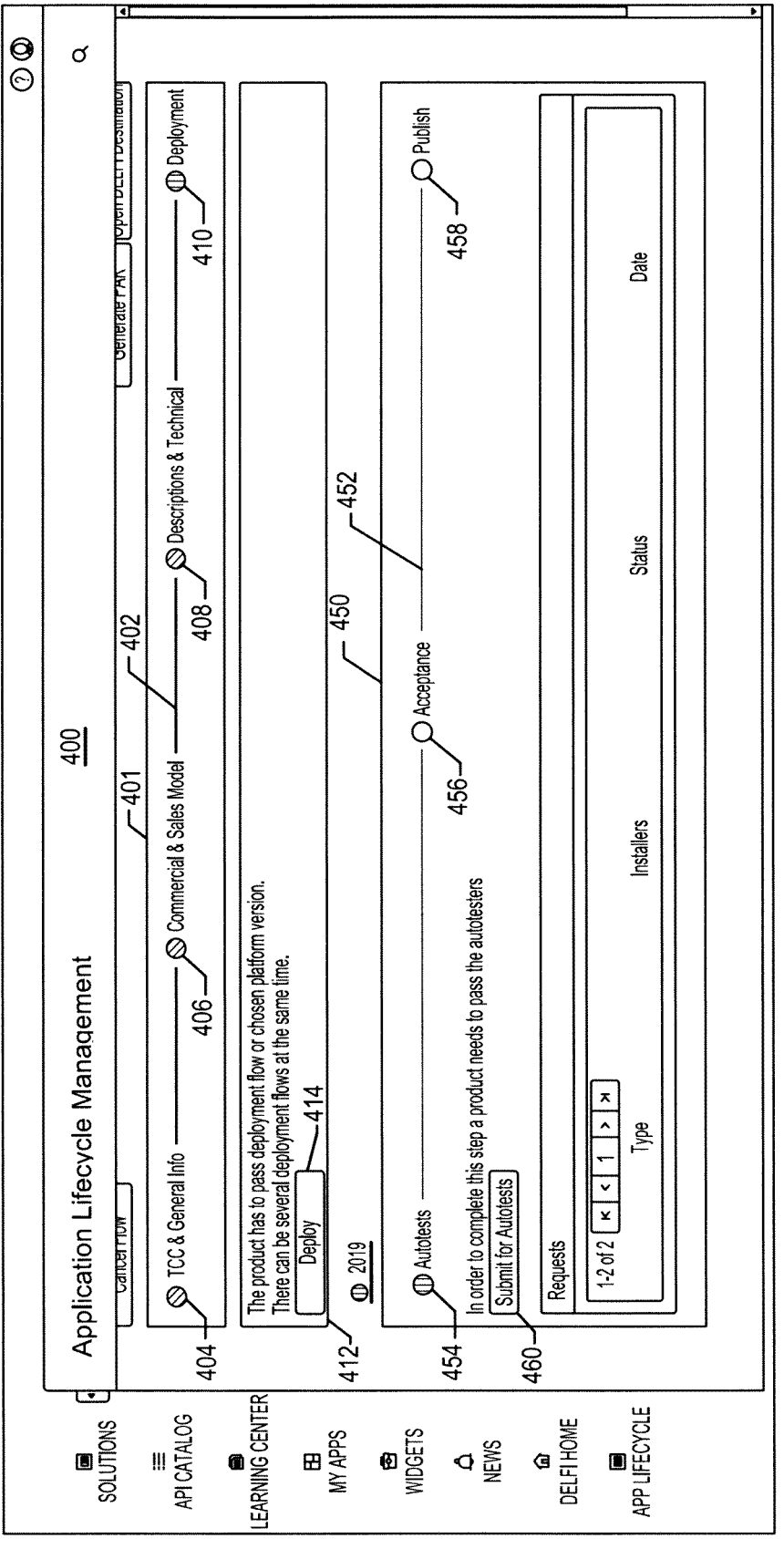
FIG. 4.4

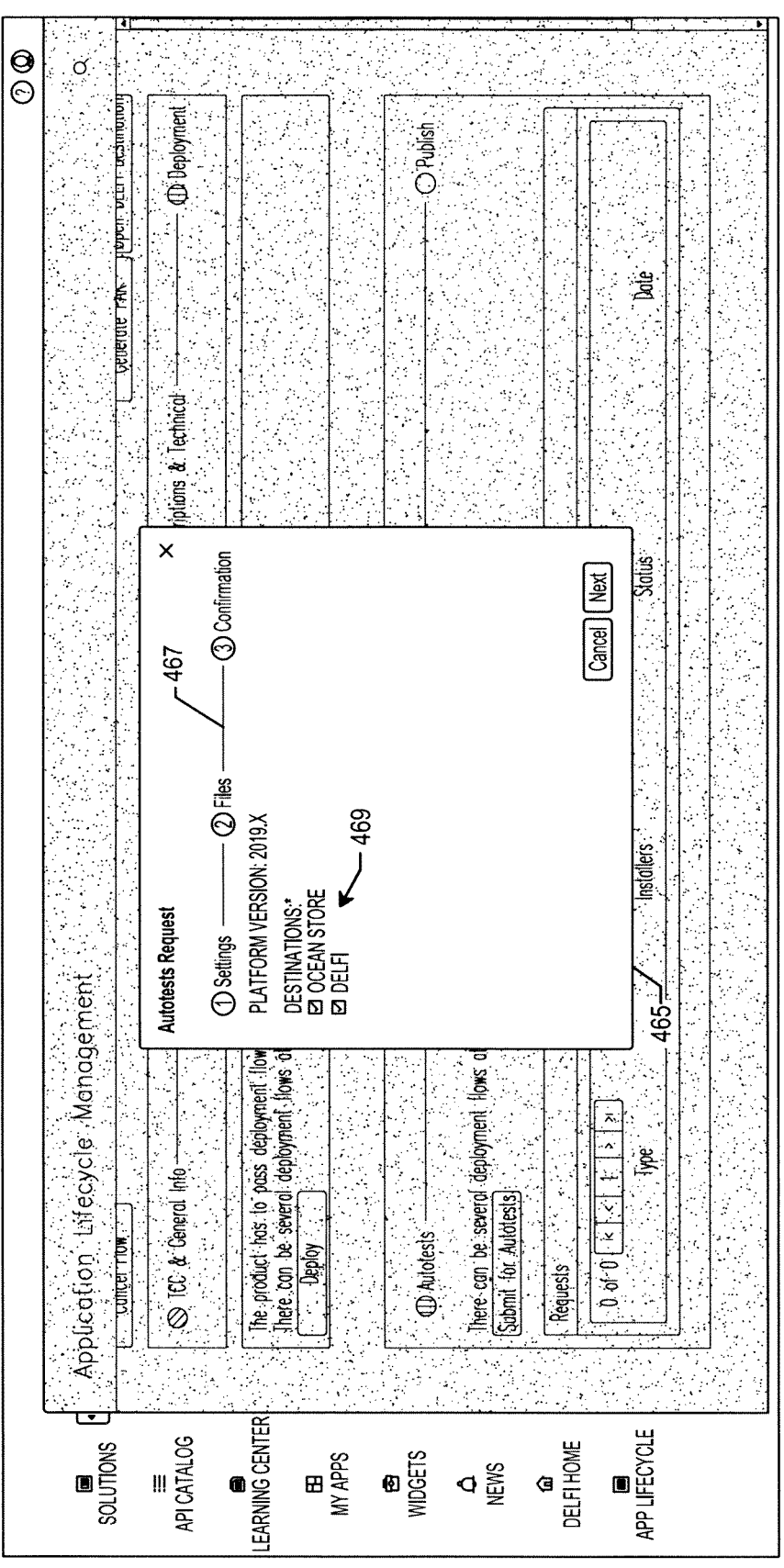
*FIG. 4.5*

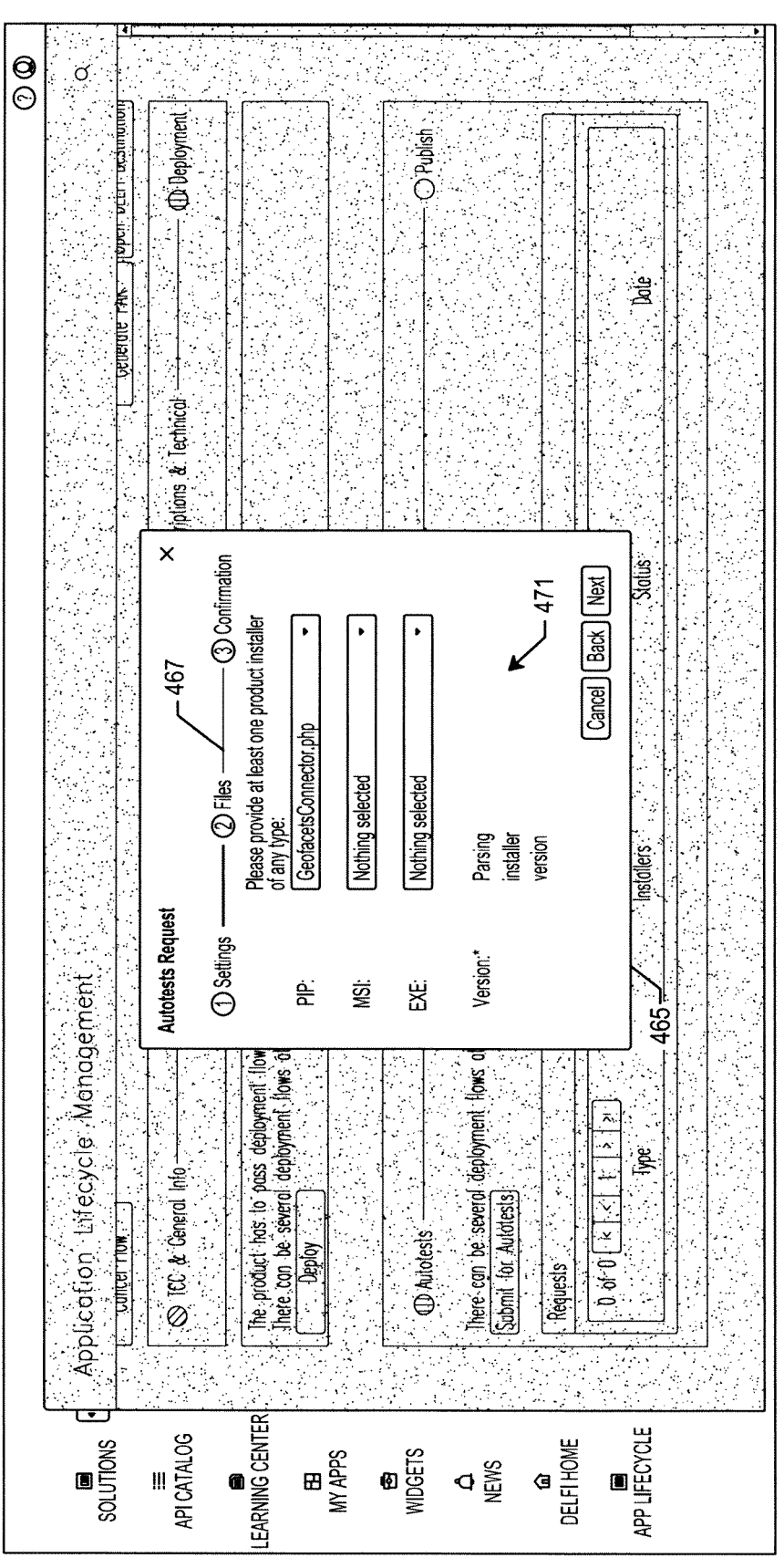
*FIG. 4.6*

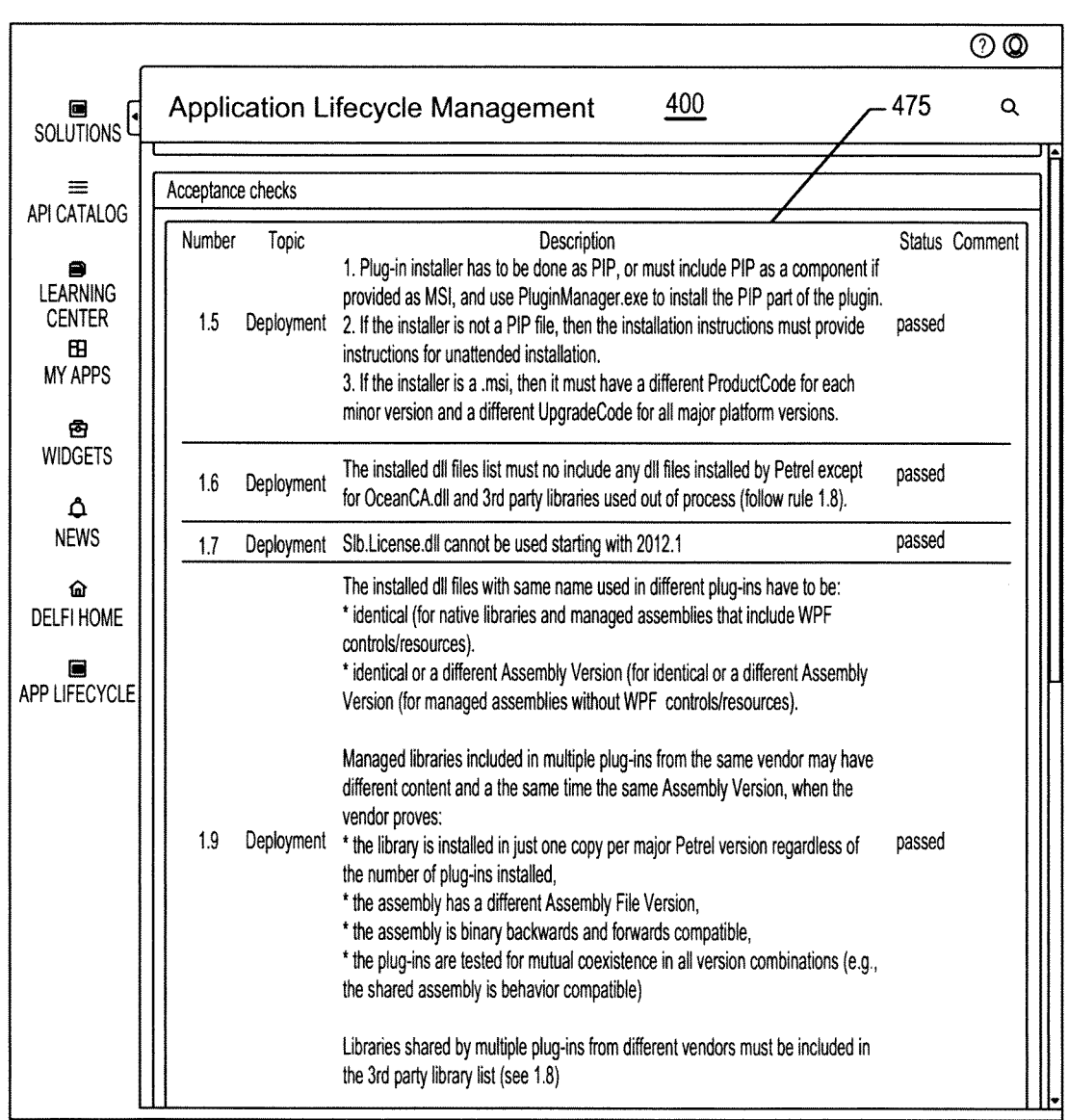

| | | | | | |
|---|---|---|---|---|---|
| | | ⊙ | ⓠ | | |

SOLUTIONS

API CATALOG

LEARNING CENTER

MY APPS

WIDGETS

NEWS

DELFI HOME

APP LIFECYCLE

Application Lifecycle Management     <u>400</u>          475     🔍

Acceptance checks

| Number | Topic | Description | Status | Comment |
|---|---|---|---|---|
| 1.5 | Deployment | 1. Plug-in installer has to be done as PIP, or must include PIP as a component if provided as MSI, and use PluginManager.exe to install the PIP part of the plugin. 2. If the installer is not a PIP file, then the installation instructions must provide instructions for unattended installation. 3. If the installer is a .msi, then it must have a different ProductCode for each minor version and a different UpgradeCode for all major platform versions. | passed | |
| 1.6 | Deployment | The installed dll files list must no include any dll files installed by Petrel except for OceanCA.dll and 3rd party libraries used out of process (follow rule 1.8). | passed | |
| 1.7 | Deployment | Slb.License.dll cannot be used starting with 2012.1 | passed | |
| 1.9 | Deployment | The installed dll files with same name used in different plug-ins have to be: * identical (for native libraries and managed assemblies that include WPF controls/resources). * identical or a different Assembly Version (for identical or a different Assembly Version (for managed assemblies without WPF controls/resources). Managed libraries included in multiple plug-ins from the same vendor may have different content and a the same time the same Assembly Version, when the vendor proves: * the library is installed in just one copy per major Petrel version regardless of the number of plug-ins installed, * the assembly has a different Assembly File Version, * the assembly is binary backwards and forwards compatible, * the plug-ins are tested for mutual coexistence in all version combinations (e.g., the shared assembly is behavior compatible) Libraries shared by multiple plug-ins from different vendors must be included in the 3rd party library list (see 1.8) | passed | |

*FIG. 4.7*

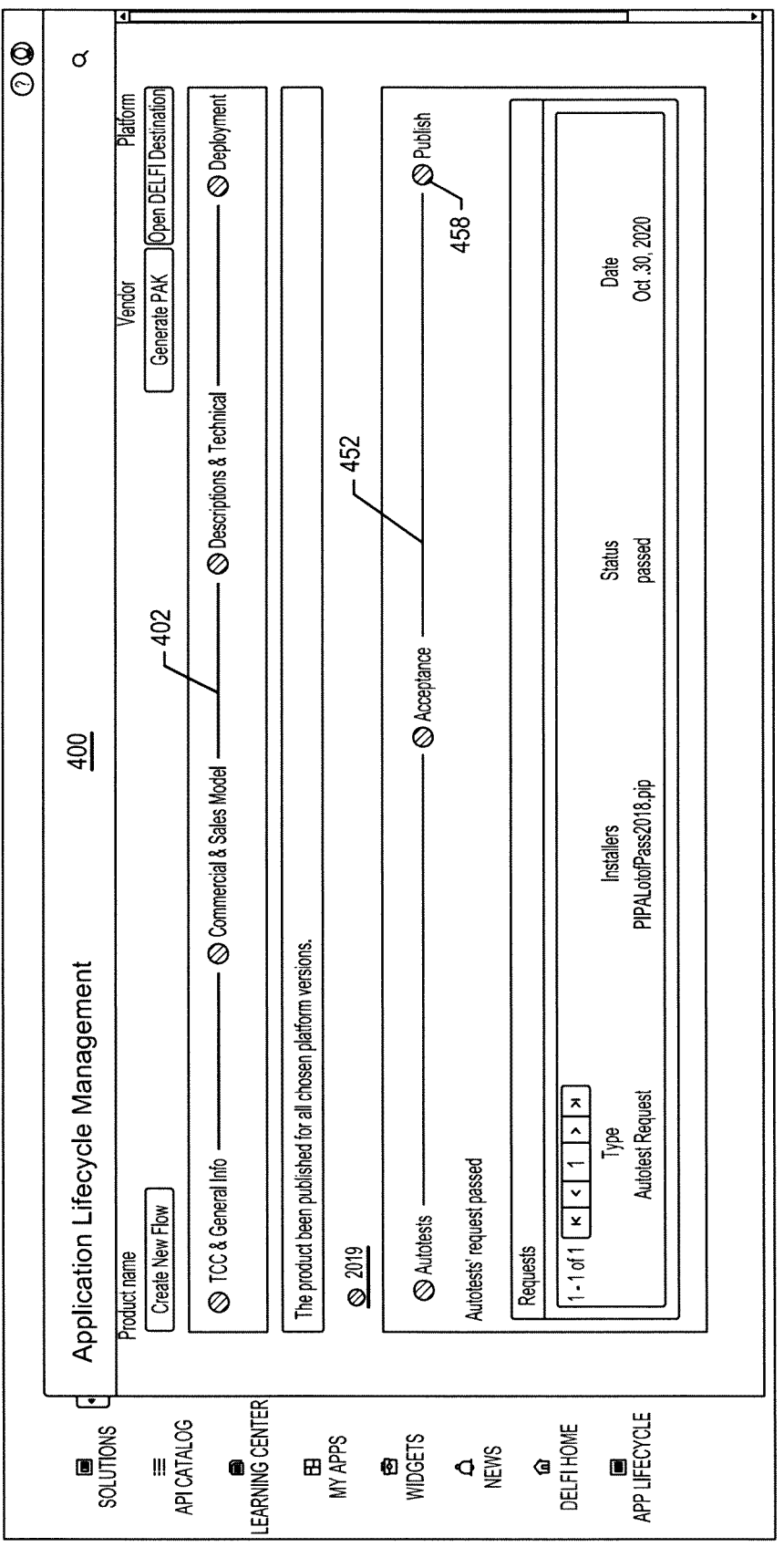
*FIG. 4.8*

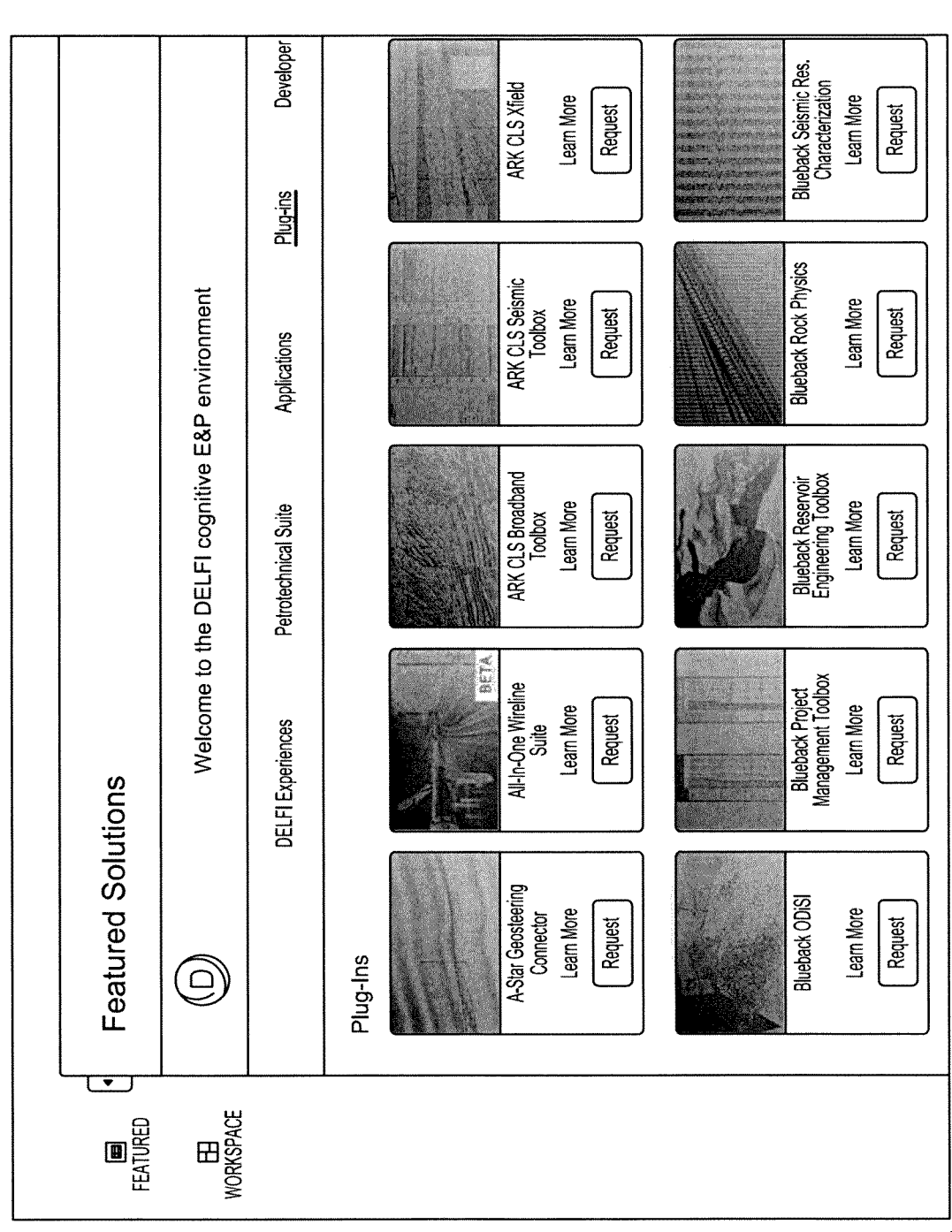
*FIG. 4.9*
485

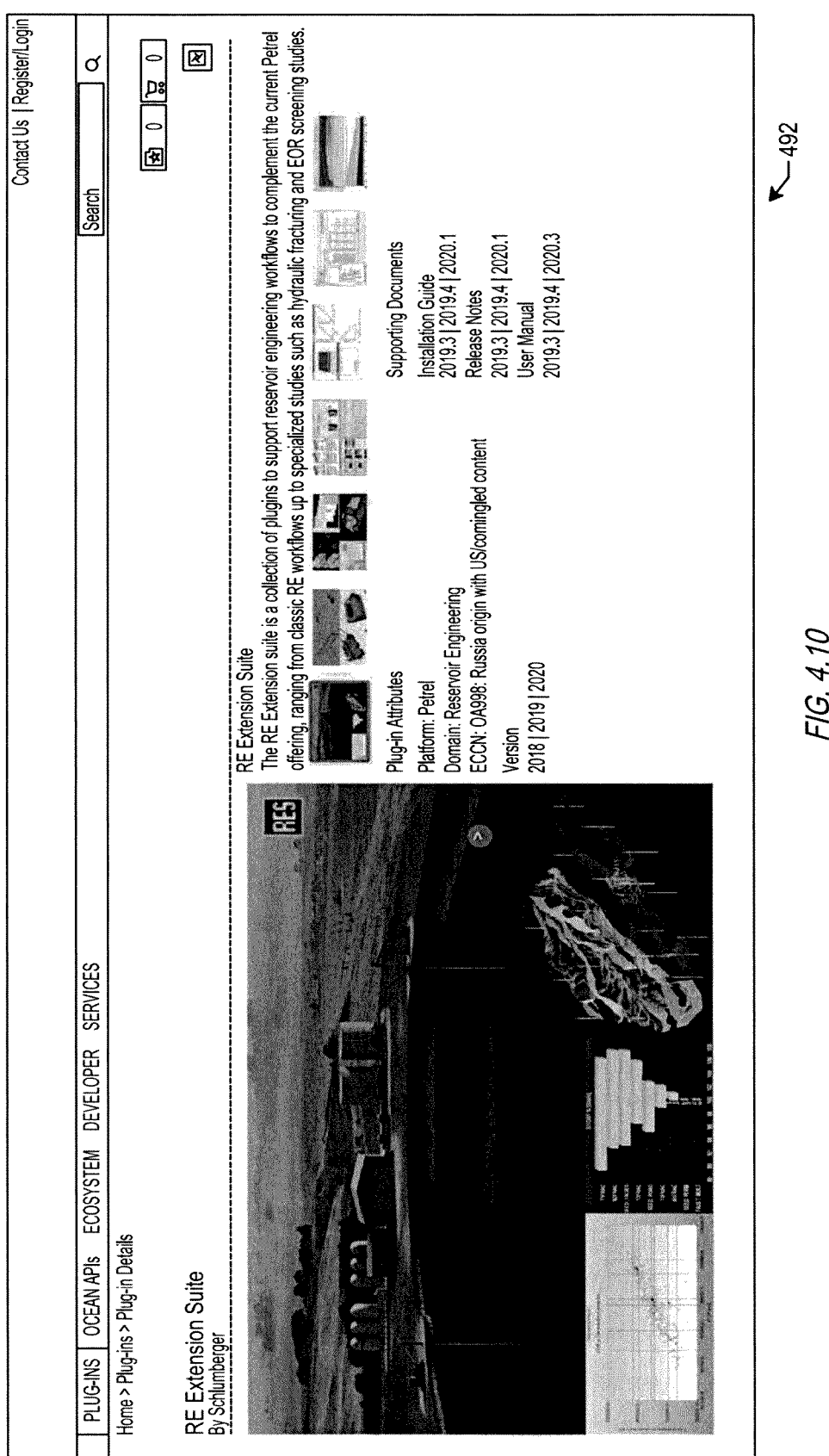
*FIG. 4.10*

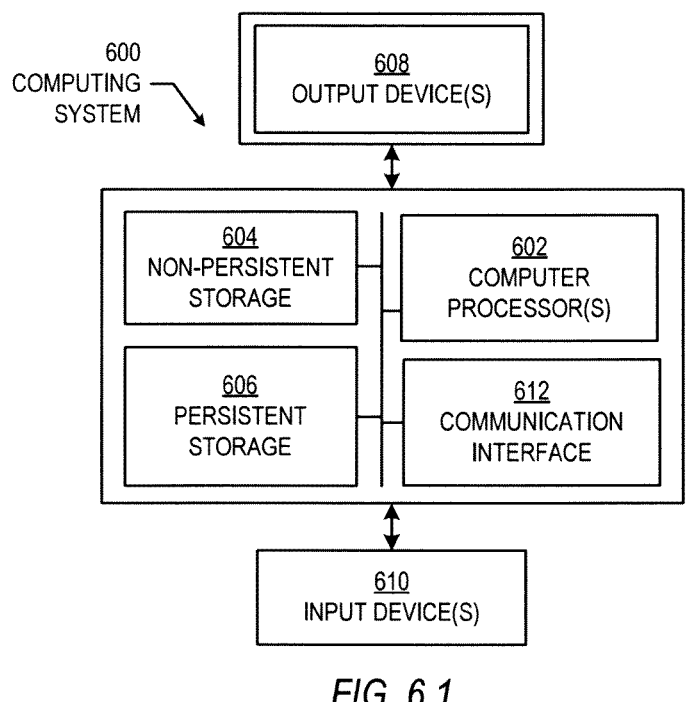
600
COMPUTING
SYSTEM
608
OUTPUT DEVICE(S)
604
NON-PERSISTENT
STORAGE
602
COMPUTER
PROCESSOR(S)
606
PERSISTENT
STORAGE
612
COMMUNICATION
INTERFACE
610
INPUT DEVICE(S)
*FIG. 6.1*
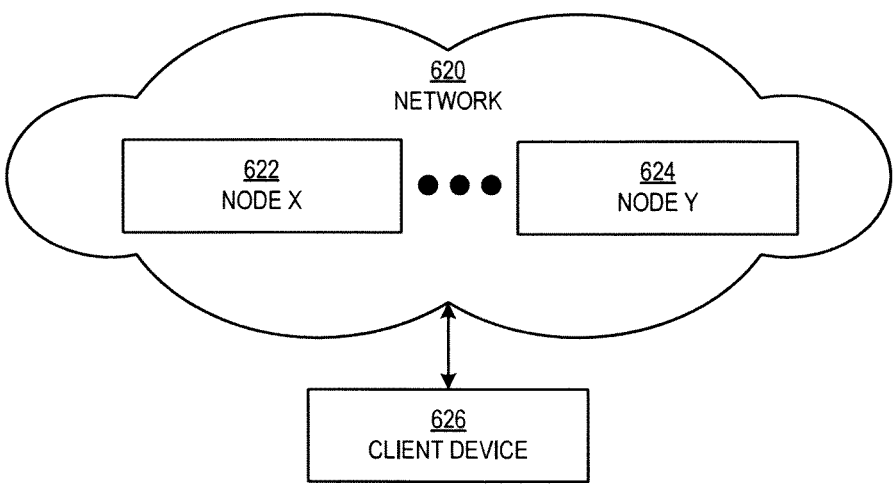
620
NETWORK
622
NODE X
624
NODE Y
626
CLIENT DEVICE
*FIG. 6.2*

APPLICATION LIFECYCLE MANAGEMENT

CROSS-REFERENCE TO RELATED APPLICATION

This application is a National Stage Entry of International Application No. PCT/RU2021/000188, filed May 4, 2021, which is incorporated by reference herein.

BACKGROUND

Before applications or plug-ins are deployed for use either in a monolithic or cloud environment, the software forming the applications and plug-ins are tested and validated. Testing and validation involves the software passing a series of acceptance tests and checking the documentation of the software. Testing and validation may include multiple updates and iterations until the tests and checks are satisfied. With successive iterations, failures in the testing and validation are fed back to developers. In turn, developers may resubmit new software and documentation for testing and validation. To date, a mixture of tools are used to exchange information including web based collaboration tools, email, and spreadsheets. Additionally, the software being validated and tested may be built for different application platforms and distributed with different distribution applications. A consequence of the diversity of tools, platforms, and distribution is the fragmentation of data and information for the software is located in different places using formats. A challenge is to test and validate the software using a minimum number of tools with the appropriate platforms and clearly communicate relevant information about the status of the testing and validation.

SUMMARY

In general, in one or more aspects, the disclosure relates to a method that implements application lifecycle management. A progress bar is presented, by an intake application executing on a processor, with state information of a developed application. Marketing information corresponding to the developed application is validated by the intake application. Validation information, the state information, and the progress bar are updated, by the intake application, in response to validating the marketing information. Licensing information is validated corresponding to the developed application. The validation information, the state information, and the progress bar are updated in response to validating the licensing information. The developed application is validated with a deployment test corresponding to an application platform of the developed application. The validation information, the state information, and the progress bar are updated in response to validating the developed application with a deployment test. The developed application is validated with an acceptance test responsive to updating the state information with validation of the licensing information and validation with the deployment test. The validation information, the state information, and the progress bar are updated in response to validating the developed application with an acceptance test. A publication request is generated responsive to updating the state information with validation of the developed application with the acceptance test and validation of the marketing information. The publication request is validated using the validation information. The developed application is published to a distribution application.

Other aspects of the disclosure will be apparent from the following description and the appended claims.

BRIEF DESCRIPTION OF DRAWINGS

FIG. 1 and FIG. 2 show systems in accordance with disclosed embodiments.

FIG. 4.1, FIG. 4.2, FIG. 4.3, FIG. 4.4, FIG. 4.5, FIG. 4.6, FIG. 4.7, FIG. 4.8, FIG. 4.9, FIG. 4.10, and FIG. 5 show examples in accordance with disclosed embodiments.

FIG. 6.1 and FIG. 6.2 show computing systems in accordance with disclosed embodiments.

DETAILED DESCRIPTION

Figure 1:
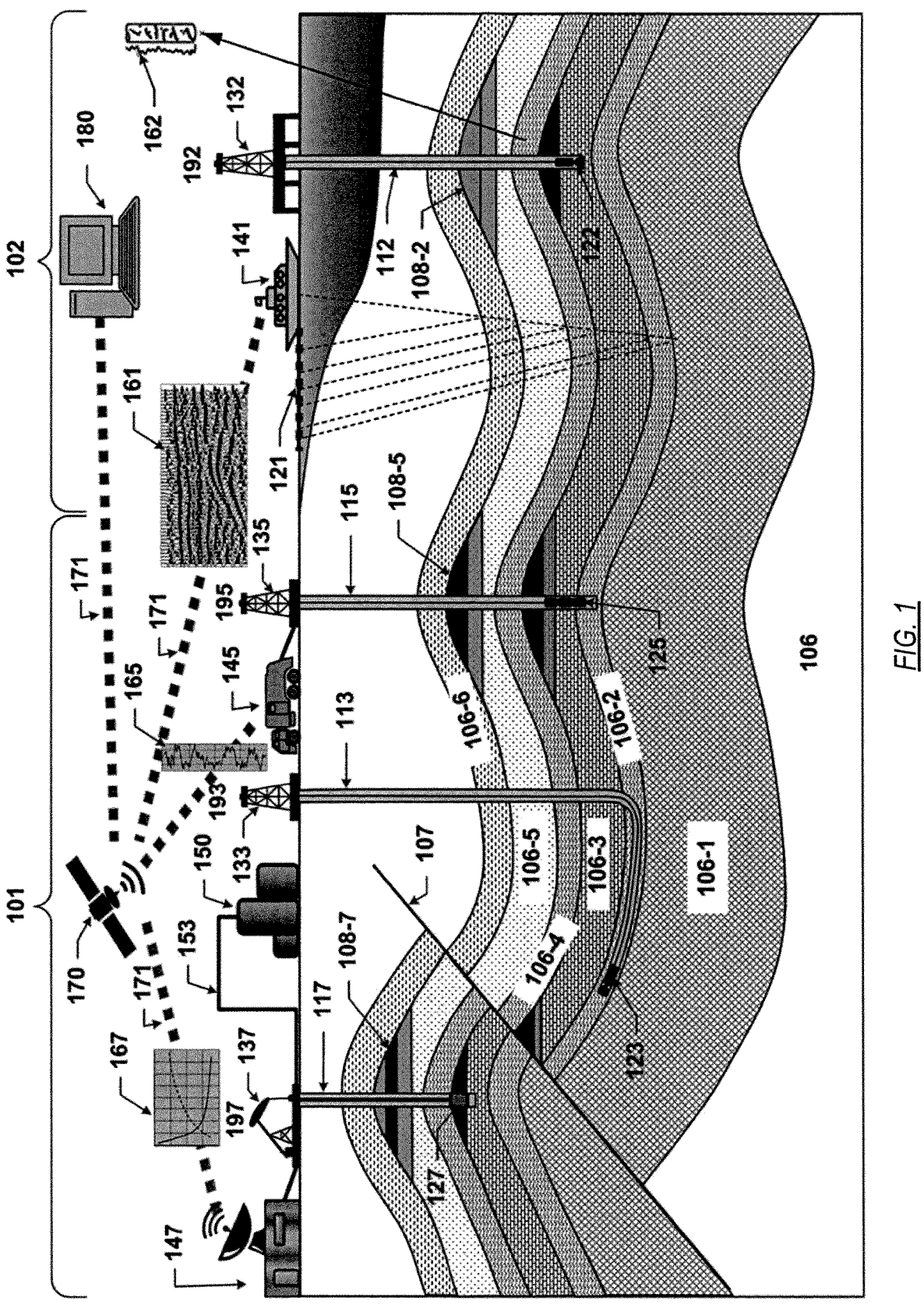

Specific embodiments will now be described in detail with reference to the accompanying figures. Like elements in the various figures are denoted by like reference numerals for consistency.

In the following detailed description of embodiments of the technology, numerous specific details are set forth in order to provide a more thorough understanding. However, it will be apparent to one of ordinary skill in the art that various embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Application lifecycle management implemented through an intake application improves the way software (for plug-ins and applications) and documentation are exchanged with independent software vendors in the oil and gas sector. Application lifecycle management enhances the communication between the testers and validators with the developers. Developers are provided status updates for the steps of the testing, validation, and publication using a single interface. In addition, automation mitigates manual intervention. Additionally, the deployment testing embedded in the testing and validation workflow may be executed separately in a client setting using the development pipelines of the client.

To clearly communicate relevant information about the status of the testing and validation, embodiments of the disclosure include an intake application that receives compliance information, marketing information, licensing information, and an installer for the software to test and validate. A first flow captures, tests, and validates the compliance information, the licensing information, and marketing information. A second flow captures, tests, and validates the software with a deployment test and an acceptance test. During the testing and validation, a progress bar with multiple indicators shows the status of the testing and validation.

Turning to the figures, FIG. 1 depicts a schematic view, partially in cross section, of an onshore field (101) and an offshore field (102) in which one or more embodiments may be implemented. The embodiments of FIG. 1 may include the features and embodiments described in the other figures of the application. One or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an exploration and production (E&P) computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example, the sandstone layer (106-5). The rock formations may include at least one seal rock, for example, the shale layer (106-6), which may act as a top seal. The rock formations may include at least one source rock, for example, the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

Data acquisition tools (121), (123), (125), and (127), may be positioned at various locations along the field (101) or field (102) for collecting data from the subterranean formations of the geologic sedimentary basin (106), referred to as survey or logging operations. In particular, various data acquisition tools are 'adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit, e.g., the seismic acquisition vessel (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). A wellsite system may be connected to a production equipment. For example, the well system (197) is connected to the surface storage tank (150) through the fluids transport pipeline (153).

The surface units (141), (145), and (147), may be operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. The surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

The surface units (141), (145), and (147) may be communicatively coupled to the E&P computer system (180) via the communication links (171). The communication between the surface units and the E&P computer system (180) may be managed through a communication relay (170). For example, a satellite, tower antenna or any other type of communication relay may be used to gather data from multiple surface units and transfer the data to a remote E&P computer system (180) for further analysis. Generally, the E&P computer system (180) is configured to analyze, model, control, optimize, or perform management tasks of the aforementioned field operations based on the data provided from the surface unit. The E&P computer system (180) may be provided with functionality for manipulating and analyzing the data, such as analyzing seismic data to determine locations of hydrocarbons in the geologic sedimentary basin (106) or performing simulation, planning, and optimization of E&P operations of the wellsite system. The results generated by the E&P computer system (180) may be displayed for a user to view the results in a two-dimensional (2D) display, three-dimensional (3D) display, or other suitable displays. Although the surface units are shown as separate from the E&P computer system (180) in FIG. 1, in other examples, the surface unit and the E&P computer system (180) may also be combined. The E&P computer system (180) and/or surface unit may correspond to a computing system, such as the computing system shown in FIGS. 6.1 and 6.2 and described below.

FIG. 2 shows a diagram of the system (200) that implements application lifecycle management. Embodiments of FIG. 2 may be combined and may include or be included within the features and embodiments described in the other figures of the application. The features and elements of FIG. 2 are, individually and as a combination, improvements to the technology of application deployment. The various elements, systems, and components shown in FIG. 2 may be omitted, repeated, combined, and/or altered as shown from FIG. 2. Accordingly, the scope of the present disclosure should not be considered limited to the specific arrangements shown in FIG. 2.

Turning to FIG. 2, the system (200) includes the cloud computing environment (202), which operates the intake application (210) to service requests from the consumption devices (270), development devices (275), and validation devices (280) and to access information and data in the repository (230).

The intake application (210) is a program operating on at least one of the servers (204) hosted by the cloud environment (202). In one embodiment, the intake application (210) includes a web application that presents web pages to the development device (276) and the validation device (280). Example web pages are described below with references to FIGS. 4.1 through 4.10. The intake application communicates the state information (245) and the validation information (243) with a progress bar presented to and displayed by the development device (276) and the validation device (281).

The intake application (210) tests and validates developed applications and corresponding information with multiple flows, to publish the developed applications to the distribution applications (212). For example, in a first flow and after receiving the compliance information (237), the marketing information (239), and the licensing information (241), the intake application (210) validates the compliance information (237), the marketing information (239), and the licensing information (241), and updates the validation information (243) and the state information (245) as validations are satisfied. In a second flow and after validating the compliance information (237), the marketing information (239), and the licensing information (241), the intake application (210) tests the developed application (235) with the deployment test (250) and then with the acceptance test (253). The intake application (210) then updates the validation information (243) and the state information (245) as the deployment test (250) and the acceptance test (253) are satisfied.

To test the developed application (235), the intake application (210) instantiates the test instance (208) and installs the developed application (235) to the test instance (208)

(described below). The intake application then executes the deployment test (250) and the acceptance test (253) using the test instance (208).

The cloud computing environment (202) hosts the servers (204) and the test instances (207). The cloud computing environment (202) is a collection of hardware and software components that execute the applications of the system (200). The cloud computing environment (202) provides on-demand availability of computer system resources including servers, storage, databases, etc. The cloud computing environment (202) may be a private cloud of an individual organization or a public cloud available to multiple organizations. The cloud computing environment (202) hosts the servers (204), test instances (207), distribution applications (212), and application platforms (215), as well as the intake application (210).

The servers (204), including the server (205), execute the applications hosted by the cloud computing environment (202), including the intake application (210), the distribution applications (212), and the application platforms (216). The servers (204) receive and respond to requests from the consumption devices (270), the development devices (275), and the validation devices (280) and access the information stored in the repository (230). The servers (204) may be embodied as the computing system (600) as described in FIG. 6.1.

The test instances (207) include the test instance (208). In one embodiment, the test instance (208) is an isolated execution environment for testing the developed application (235). For example, the test instance (208) may be a container or other type of virtual machine. The test instance may be a virtual computing system that executes on one of the computing systems described in FIG. 6.1. In one embodiment, the test instances (207) are virtual machines onto which the developed applications are installed and tested. In one embodiment, the test instance (208) may execute and test the developed application (235) using either the deployment test (250) or the acceptance test (253). The test instance (208) may include the application platform (216) used by the developed application (235).

The distribution applications (212) include the distribution application (213). The distribution application (213) distributes and deploys the developed application (235) to the consumption devices (270) after the developed application (235) is tested and validated by the intake application.

The different distribution applications (212) may target different types of systems and target environments. For example one of the distribution applications (212) may distribute and deploy monolithic desktop applications and another one of the distribution applications (212) may distribute and deploy cloud based applications that run in the cloud computing environment (202).

The application platforms (215) include the application platform (216). The application platform (216) includes the software components to access and analyze information from the repository (230), including the subsurface data (247). Different ones of the applications platforms (215) may be tailored to different types of analysis or different types of data from the subsurface data (247).

The application platform (216) may provide an application programming interface to the developed application (235) that is used by the developed application (235) to access and analyze the subsurface data (247).

The repository (230) is a computing system that may include multiple computing devices in accordance with the computing system (600) and the nodes (622) and (624) described below in FIGS. 6.1 and 6.2. The repository (230)

stores data and information as electronic files. The repository (230) may be hosted by a cloud services provider that provides the cloud computing environment (202). The cloud services provider may provide hosting, virtualization, and data storage services as well as other cloud services and to operate and control the data, programs, and applications that store and retrieve data from the repository (230). The data in the repository (230) includes the application data (232), the deployment tests (249), the acceptance tests (252), the subsurface data (247), etc.

The application data (232) includes the application data (233). Each of the developed applications processed by the system (200) corresponds to a subset of the application data (232). The application data (233) is a subset of the application data (232) that corresponds to the developed application (235). The application data (233) includes the developed application (235), the compliance information (237), the marketing information (239), the licensing information (241), the validation information (243), and the state information (245).

The developed application (235) is the application provide by the development device (276) being tested and validated by the intake application (210). The developed application (235) includes an installer that, when executed, installs the developed application (235) onto the test instance (208). The developed application is software that may be a desktop application, a web application, a plug-in, etc.

The compliance information (237) includes data related to compliance with trade laws. In one embodiment, the compliance information (237) includes the country of origin of the developed application (235) and trade compliance code (TCC) information. The country of origin identifies the country in which the developed application (235) is originated. The trade compliance code may include an export control classification number (ECCN), which categorizes items based on the nature of the product, i.e., type of commodity, software, or technology and its respective technical parameters, etc.

The marketing information (239) includes information that describes the developed application (235) and may be used to market the developed application (235) to consumers. For example, the marketing information (239) may include technical specifications, brochures, sales briefs, marketing images, etc. The marketing information (239) may also include a product image and product description used by one of the distribution applications (212) and presented to the consumption devices (270).

The licensing information (241) includes information that describes terms for usage of the developed application (235). For example, the developed application (235) may be free for academic use, provide a free evaluation period, and charge initial and maintenance fees. The licensing information (241) may be presented and enforced by the distribution applications (212) and displayed by the consumption devices (270).

The validation information (243) is information that identifies the success of the tests or validations of the developed application (235) and corresponding information. In one embodiment, the corresponding information for the developed application (235) includes the compliance information (237), the marketing information (239), and the licensing information (241). In one embodiment, the results of validations of the compliance information (237), the marketing information (239), and the licensing information (241) may be stored in the validation information (243). Additionally, the results of the deployment test (250) and the acceptance test (253) may be stored in the validation information (243). The validation information (243) may be generated by the intake application (210) and presented to and displayed by the development devices (275).

The state information (245) is information that identifies the status of the developed application (235) in the testing and validation process. For example, the testing and validation process may include a first flow (or validation flow) to validate the compliance information (237), the marketing information (239), and the licensing information (241) followed by a second flow (a testing flow) to test the developed application (235) against the deployment test (250) and the acceptance test (253). The status of the developed application (235) for the flows may be tracked with the state information.

The deployment tests (249) include the deployment test (250). The deployment test (250) is used to test the developed application (235) on the test instance (208) with the application platform (216). In one embodiment, the deployment test installs the developed application (235) to the test instance (208) and determines if the installation was successful. The different deployment tests (249) may correspond to different combinations of developed applications (including the developed application (235)), distribution applications (212), and application platforms (215). In one embodiment, different ones of the deployment test (250) may test the developed application (235) in different types of deployment environments that are defined by the distribution applications (212) and the application platforms (215). The deployment test (250) may install the developed application (235) onto the test instance (208) with the application platform (216). The deployment test (250) may also determine that the libraries used by the developed application (235) are properly signed. The deployment test (250) is an initial test to ensure that the developed application (235) is ready for more extensive testing with the acceptance test (253). For example, the deployment test (250) may test to determine if the application is installable and executable on the test instance (208). The deployment test (250) may be performed automatically and generate the set of deployment test logs that identify issues encountered during testing the developed application (235) with the deployment test (250).

The acceptance tests (252) include the acceptance test (253). The acceptance test (253) is used to test the developed application (235) on the test instance (208) with the application platform (216) and may ensure that the technical specification of the developed application (235) is satisfied. The acceptance test (253) may also test the developed application (235) with the distribution application (213). The acceptance test (253) may be an extensive test of the usability of the developed application (235) that may test a graphical user interface of the developed application (235) to ensure proper functioning of the graphical user interface and the developed application (235). The acceptance test (253) may be performed automatically and include manual input that identifies issues encountered during testing the developed application (235) with the acceptance test (253). The output of the acceptance test (253) may include a report that includes screenshots of the graphical user interface of the developed application (235).

The consumption devices (270), development devices (275), and validation devices (280) are computing systems as described in FIG. 6.1. For example, the consumption device (271), the development device (276), and the validation device (281) may be desktop computers. The consumption device (271) executes the consumption application (273), the development device (276) executes the development application (278), and the validation device (281) executes the validation application (283).

The consumption application (273) is a program that runs on the consumption device (271). The consumption application (273) may be used by a consumer using the consumption device (271) to purchase and access the developed application through the distribution application (213). The consumption application (273) accesses the developed application (235) through the distribution application (213). For example, the consumption application (273) may be a web browser that connects to a web page of the distribution application (213) and selects to download the developed application (235) through the web page of the distribution application (213).

The development application (278) is a program that runs on the development device (276). The development application (278) may be used by developers to design, create, and perform testing of a software application (e.g., the developed application (235)). The development application (278) accesses the intake application (210) to provide the developed application (235), the compliance information (237), the marketing information (239), and the licensing information (241) to the intake application (210). The development application (278) may display a progress bar, presented to the development application (278) from the intake application (210), which displays the validation information (243) and the state information (245) to identify progress of the developed application (235) through the testing and validation performed by the intake application (210) for the developed application (235).

The validation application (283) is a program that runs on the validation device (281). The validation application (283) may access the intake application (210) to assist with the testing and validation of the developed application (235). For example, the validation application (283) may perform tasks from the acceptance test (253) that test the graphical user interface of the developed application (235). The validation application (283) may also be used to monitor and assist with the progress of the developed application (235) through the testing and validation performed by the intake application (210).

The consumption application (273), development application (278), and the validation application (283) may be web browsers that access the applications running on the server cloud computing environment (202) using web pages hosted by the servers (204). In one embodiment, consumption application (273), development application (278), and the validation application (283) may be web services that communicate with the applications running on the servers (204) using representational state transfer application programming interfaces (RESTful application programming interface(s) (API)s). Although FIG. 2 shows a client server architecture using the cloud computing environment (202), one or more parts of the application of the system (200) may be local applications on the consumption devices (270), development devices (275), and validation devices (280) without departing from the scope of the disclosure.

Figure 3:
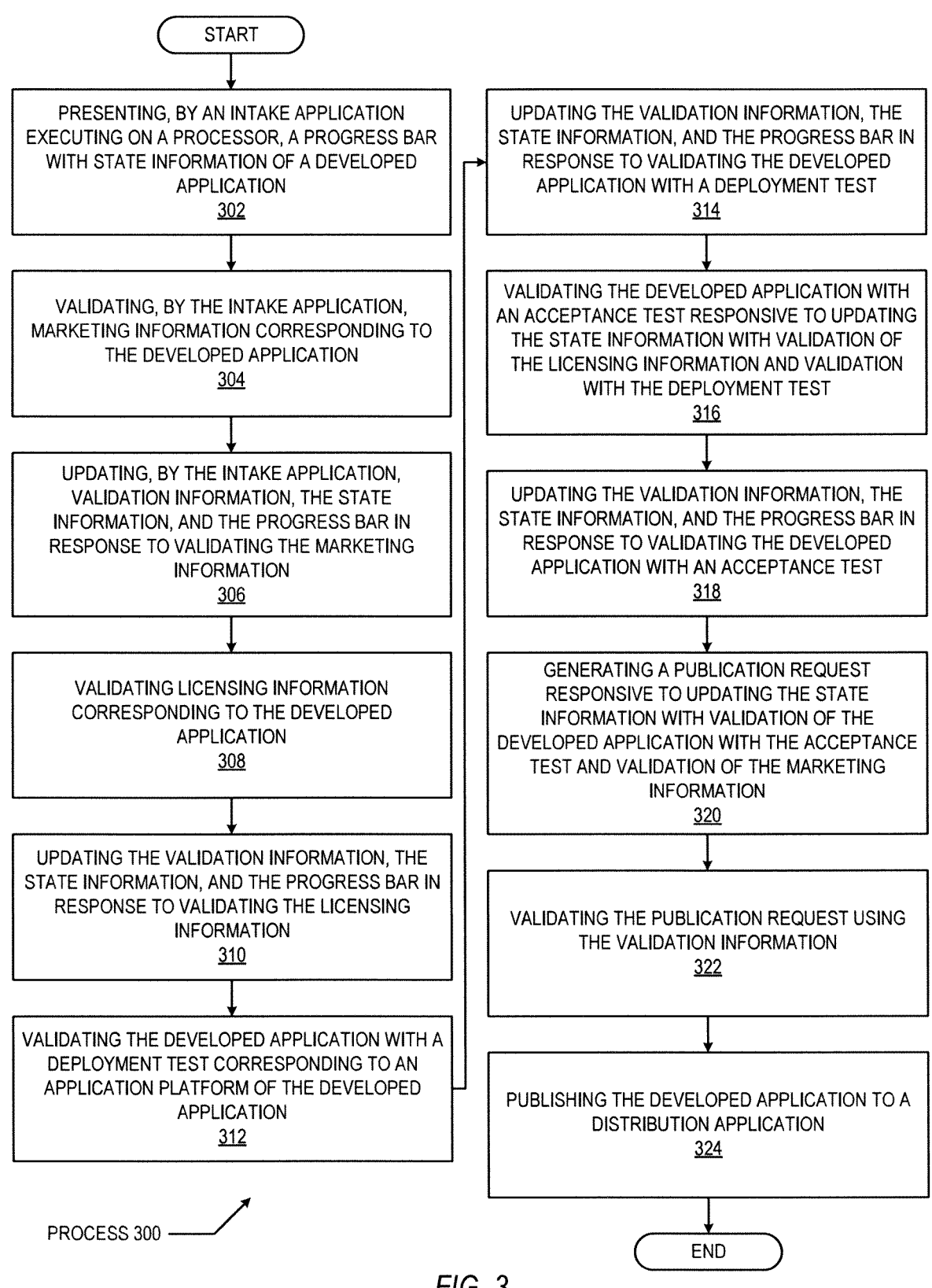
FIG. 3 shows a flowchart in accordance with disclosed embodiments.

FIG. 3 shows a flowchart of the process (300) in accordance with the disclosure. FIG. 3 is a flowchart of a method for application lifecycle management, which may be performed by computing systems. The embodiments of FIG. 3 may be combined and may include or be included within the features and embodiments described in the other figures of the application. The features of FIG. 3 are, individually and as an ordered combination, improvements to application testing and distribution technology and underlying computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 3, in Block 302, a progress bar with state information of a developed application (which may process subsurface data) is presented by the intake application executing on a processor of a server. For example, the progress bar may be defined in a web page that is transmitted to, and displayed by, a developer device.

In one embodiment, prior to validating the marketing information and prior to validating the licensing information, compliance information is received by the intake application from a client device. In one embodiment, compliance information includes a trade compliance identifier, with an export control classification number (ECCN), and an identifier of a country of origin for the developed application.

In Block 304, marketing information, corresponding to the developed application, is validated by the intake application. In one embodiment, the marketing information is received by the intake application from a developer device in response to a developer interacting with a graphical user interface displayed on the developer device. The marketing information may be validated by determining that no changes to the marketing information exists from a previous version that has previously been validated. In one embodiment, the marketing information is validated by determining that a number of predetermined files are included with the marketing information. Additional validation may be performed by executing a spell check and grammar check on the text data in the marketing information. In one embodiment, the marketing information includes a technical specification, a brochure, a brief, and an image, which are stored as electronic files.

In Block 306, validation information, the state information, and the progress bar are updated by the intake application in response to validating the marketing information. In one embodiment, the validation information and the state information are updated by the intake application to identify that the marketing information has been successfully validated and the progress bar is updated to show the updates to the validation information and the state information.

In Block 308, licensing information, corresponding to the developed application, is validated. In one embodiment, the licensing information is received by the intake application from a developer device in response to a developer interacting with a graphical user interface displayed on the developer device. In one embodiment, the licensing information is validated by determining that a selection is made for the possible terms of the licensing information. The licensing information may also be validated by determining that no changes exist to the licensing information as compared to a previous version of the licensing information that has previously been validated. The terms in the licensing information may include educational use, evaluation periods, periodic license fees, etc.

In Block 310, the validation information, the state information, and the progress bar are updated in response to validating the licensing information. In one embodiment, the validation information and the state information are updated by the intake application to identify that the licensing information has been successfully validated and the progress bar is updated to show the updates to the validation information and the state information.

In Block 312, the developed application is validated with a deployment test corresponding to an application platform of the developed application. In one embodiment, the developed application is received by the intake application from a developer device. In one embodiment, validation with the deployment test includes installing the developed application onto a test instance with the application platform, determining that the developed application is successfully installed on the test instance, determining that the application platform remains successfully installed on the test instance, and verifying that the developed application and the application platform on the test instance are operable. In one embodiment, the deployment test may be successful when the installation does not generate errors or warnings, which may be determined from scanning the installation log. Issues from the automated installation process of the developed application may be identified in logs generated by the installation process.

In Block 314, the validation information, the state information, and the progress bar are updated in response to validating the developed application with a deployment test. In one embodiment, the validation information and the state information are updated by the intake application with the results from the installation logs generated from installing the developed application to the test instance.

In Block 316, the developed application is validated with an acceptance test responsive to updating the state information with validation of the licensing information and validation with the deployment test. In one embodiment, validation with the acceptance test includes locating a test instance onto which the application platform is installed, installing the developed application onto a test instance or a validator device (if not already installed), operating the developed application on the test instance, and receiving a report indicating the developed application passed the acceptance test. Locating the test instance may include identifying the test instances connected to a network and identifying a test instance that includes the application platform corresponding to the developed application. The acceptance test may include testing a graphical user interface showing the developed application. Issues from the acceptance test may be stored in a report that includes screen shots of the graphical user interface (GUI) of the developed application. In one embodiment, the test instance used for the acceptance test may be the same test instance for the deployment test.

In Block 318, the validation information, the state information, and the progress bar are updated in response to validating the developed application with an acceptance test. In one embodiment, the intake application updates the information and presents the updated information to a developer device by transmitting the updated information to the developer device, which displays the updated information.

In Block 320, a publication request is generated responsive to updating the state information with validation of the developed application with the acceptance test and validation of the marketing information. In one embodiment, the intake application generates the publication request after the developed application and corresponding information have been tested and validated. In one embodiment, generation of the publication request may be triggered by passing the acceptance test.

In Block 322, the publication request is validated using the validation information. In one embodiment, the publication request is validated by the intake application, which determines that the compliance information, the marketing information, and the licensing information have been received and validated and that there are no outstanding issues from the results of the deployment test and the acceptance test.

In Block 324, the developed application is published to a distribution application. In one embodiment, the developed application is published by transferring files from the marketing information to the distribution application. The distribution application may present the marketing information by transmitting the marketing information, describing the developed application, to a consumption device viewing a marketplace web page hosted by the distribution application.

In one embodiment, the developed application is distributed by the distribution application in accordance with the licensing information. For example, a user of a consumption device may not be able to access the developed application without paying a periodic licensing fee.

Figure 5:
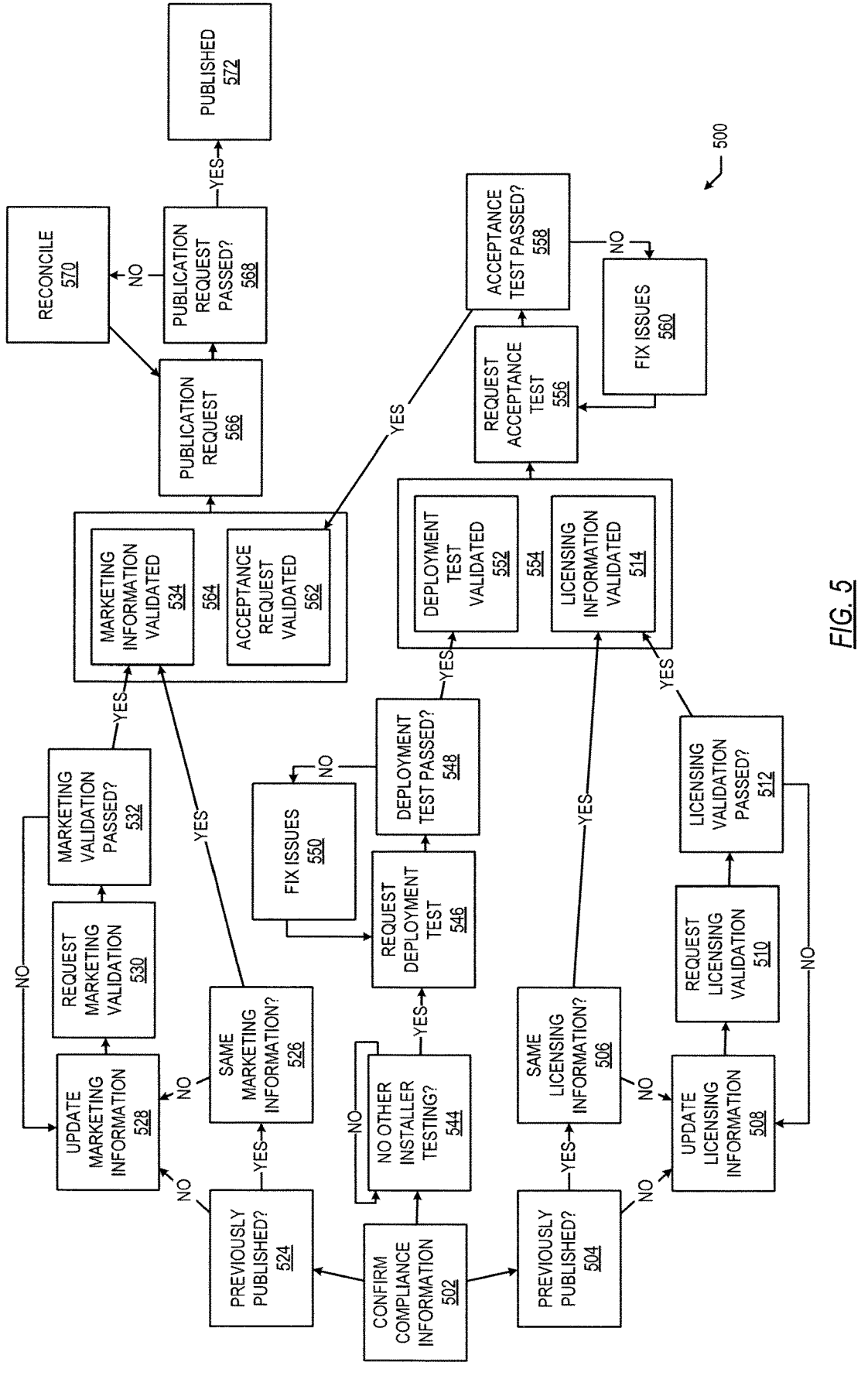

FIGS. 4.1, 4.2, 4.3, 4.4, 4.5, 4.6, 4.7, 4.8, 4.9, 4.10, and 5 show examples of systems and sequences that secure hash chains in accordance with the disclosure. FIGS. 4.1, 4.2, 4.3, 4.4, 4.5, 4.6, 4.7, 4.8, 4.9, 4.10, show a web application that implements application lifecycle management. FIG. 5 shows a flowchart of application lifecycle management. FIGS. 4.1, 4.2, 4.3, 4.4, 4.5, 4.6, 4.7, 4.8, 4.9, 4.10, and 5 may be combined and may include or be included within the features and embodiments described in the other figures of the application. The features and elements of FIGS. 4.1, 4.2, 4.3, 4.4, 4.5, 4.6, 4.7, 4.8, 4.9, 4.10, and 5 are, individually and as a combination, improvements to application testing and distribution technology and underlying computing systems. The various features, elements, widgets, components, and interfaces shown in FIGS. 4.1, 4.2, 4.3, 4.4, 4.5, 4.6, 4.7, 4.8, 4.9, 4.10, and 5 may be omitted, repeated, combined, and/or altered as shown. Accordingly, the scope of the present disclosure should not be considered limited to the specific arrangements shown in FIGS. 4.1, 4.2, 4.3, 4.4, 4.5, 4.6, 4.7, 4.8, 4.9, 4.10, and 5.

Turning to FIG. 4.1, the web page (400) is presented by an intake application to a developer device. The web page (400) includes several graphical user interface widgets that receive user inputs to transfer a developed application and the corresponding information to the intake application hosting the web page (400).

The web page (400) includes the progress bar (402) displayed in the panel (401). The progress bar (402) includes the indicators (404) through (410). The indicators (404) through (410) display the validation information and state information of the developed application.

Each of the indicators (404) through (410) may be displayed with different symbols or colors to identify the validation and status update developed application and the corresponding information. The indicator (404) provides the validation and status of the compliance information for the developed application. The indicator (404) is displayed as yellow. Yellow indicates that the validation flow, represented by the progress bar (402), is at the compliance state. In the compliance state, the system is waiting to receive compliance information. In one embodiment, the indicators (406), (408), and (410) are shown in gray to indicate that the validations for the steps corresponding to the indicators (406), (408), and (410) has not been completed and cannot be started until the state for indicator (404) (i.e., validation of the compliance information) has been completed.

The web page also includes the panel (412) which includes the button (414). The panel (412) is displayed when the developed application has previously been submitted to the intake application with compliance information that has been accepted by the intake application. Selection of the button (414) indicates that there was no change to the compliance information from the previous submission and allows for transition to the next state of the intake application.

The web page (400) also includes the panel (416), which includes several widgets that may be interacted with to transmit compliance information to the intake application. In one embodiment, selection of one of the widgets (420) brings up a window from which the user may select or upload information to the intake application. The compliance information collected through the widgets (420) may include a product name that identifies the name of the developed application, a country of origin identifier that identifies the country of origin of the developed application, a platform identifier that identifies the application platform used by the developed application, a TCC attachment that describes the trade compliance of the developed application, a vendor identifier that identifies the vendor of the developed application, a country restrictions identifier that identifies the countries in which use of the developed application is restricted, and an ECCN identifier that identifies the export compliance control number for the developed application.

After providing the compliance information to the panel (416) using the widgets (420), the compliance information is validated by the intake application and the intake application updates to the validation information and the state information. The updates to the validation information and the state information are displayed on the progress bar (402) by changing the color of the indicator (404) from yellow to green.

Turning to FIG. 4.2, the web page (400) is updated based on the compliance information being received by the intake application. The progress bar (402) in the panel (401) is updated with changes to the indicators (404) through (410). The indicator (404) is colored green to indicate that the compliance information has been received. The indicators (406) and (408) are colored yellow to indicate that the information for these stages has not been received and validated. The indicator (410) is colored red to indicate that the deployment of the developed application may not yet be tested, which may not happen until after the stages corresponding to the indicators (404) through (408) have been completed.

The panel (412) is updated to indicate that the button (414) may be used to confirm that the licensing information identified in the panels (430) and (434) has not changed from a previous submission of the developed application to the intake application. Selection of the button (414) confirms that there are no changes to the information for the panels (430) and (434).

The panels (430) and (434) replace the panel (416) (from FIG. 4.1). The panel (430) includes the widgets (432) and the panel (434) includes the widgets (436). The panels (430) and (434) use the widgets (432) and (436) to collect licensing information about the developed application from the developer device. The licensing information collected through the widgets (432) may include a feature quantity identifier that enumerates the number of features of the developed application, a lease rental identifier that identifies whether the developed application may be leased or rented, a third party software license identifier indicating whether the developed application may be licensed by a third party, a sales identifier indicating whether the developed application may be sold, a non-commercial identifier that identifies the evaluation period for the developed application for non-commercial use, a maintenance identifier that identifies whether maintenance of the developed application is included with the developed application, and a university identifier that indicates whether the developed application may be used by universities.

After providing the licensing information using the panels (430) and (434), the licensing information is validated by the intake application and the intake application updates the validation information and the state information. Updates to the validation information and the state information are displayed on the progress bar (402) by changing the color of the indicator (406) from yellow to green.

Turning to FIG. 4.3, the web page (400) is updated based on the licensing information being received by the intake application. The progress bar (402) in the panel (401) is updated with a change to the indicator (406) from yellow to green to indicate that the licensing information has been received and validated.

The panel (412) is updated to indicate that the button (414) may be used to confirm that the marketing information ("Descriptions & Technical") identified in the panel (440) has not changed from a previous submission of the developed application to the intake application. Selection of the button (414) confirms that there are no changes to the information for the panel (440).

The panel (440) is displayed on the web page (400). The panel (440) includes the widgets (442). The panel (440) uses the widgets (442) to collect marketing information about the developed application from the developer device. Selecting the widgets (442) may open windows to enter, upload, or select marketing information about the developed application stored in electronic files. The marketing information collected through the widgets (442) may include a brief description document that briefly describes the functionality of the developed application, an additional information document that provides additional information about the developed application, an overview document that includes text which provided overview about the developed application, a brochure document that provides details about the developed application, a features document that identifies features of the developed application, a sales brief document that identifies sales information about the developed application, and one or more specification documents that describe the specifications of the developed application.

After providing the marketing information using the panel (440), the marketing information is validated by the intake application and the intake application updates the validation information and the state information. Updates to the validation information and the state information are displayed on the progress bar (402) by changing the color of the indicator (408) from yellow to green.

Turning to FIG. 4.4, the web page (400) is updated based on the marketing information being received and validated by the intake application. The progress bar (402) is updated with a change to the indicator (408) from yellow to green to indicate that the marketing information has been received and validated.

The panel (412) is updated to indicate that the button (414) may be used to confirm that the developed application has not changed from a previous submission to the intake application. Selection of the button (414) confirms that there are no changes to the developed application (e.g., when the corresponding information is changed without changing the developed application).

The panel (450) is displayed in on the web page (400). The panel (450) includes the progress bar (452) and the button (460). The progress bar (452) is an extension of the progress bar (402). In one embodiment, the progress bar (402) and the progress bar (452) may be combined into a single progress bar. The progress bar (452) includes the indicators (454), (456), at (458).

The indicator (454) indicates whether the developed application has passed deployment testing (also referred to as an "autotests"). The indicator (454) is red to indicate that the developed application has not passed deployment testing. The indicator (456) may turn yellow while the deployment testing is being performed on the developed application. The indicator (456) may turn green after the deployment testing for the developed application has been successfully completed.

The indicator (456) indicates whether the developed application has passed acceptance testing. The indicator (456) is grey to indicate that acceptance testing cannot be performed, which is because the deployment testing has not been completed. The indicator (456) may turn yellow after the deployment testing is completed and the indicator (454) has turned green. The indicator (456) may turn green after the acceptance testing has been performed and is successful.

The indicator (458) indicates whether the developed application has been published to a distribution application. The indicator (458) is grey to indicate that the developed application is not ready to be published. The indicator (458) may turn yellow after acceptance testing is completed and the indicator (456) has turned green. The indicator (458) may turn green after the developed application is successfully published to the distribution applications selected for the developed application.

The button (460) is used to submit the developed application for deployment testing. Selecting the button (460) brings up a window to select the developed application from the file system of the developer device and upload the developed application to the intake application. After the developed application is successfully uploaded to the intake application, the intake application may automatically begin deployment testing of the developed application.

Turning to FIG. 4.5, after selection of the button (460) (from FIG. 4.4), the window (465) is displayed. The window (465) includes the progress bar (467) and the widgets (469). The progress bar (467) identifies a set of stages for providing the developed application to the intake application. In one embodiment, providing the files is a three stage process that includes a settings stage, a files stage and a confirmation stage. In the settings stage (shown in FIG. 4.5), the widgets (469) are shown that are used to select one or more distribution applications to which the developed application will be published. The files stage is used to identify the files of the developed application and the confirmation stage confirms the information provided during the settings stage and the files stage.

Turning to FIG. 4.6, the files stage from the progress bar (467) is displayed. The window (465) is updated to include the widgets (471). The widgets (471) receive selections that identify the different types of installation files for the developed application.

Turning to FIG. 4.7, the web page (400) is updated to show the panel (475). The panel (475) shows the results from the acceptance testing for the developed application.

Turning to FIG. 4.8, the web page (400) is updated to show the completion of both progress bars (402) and (452). The indicator (458) is updated to green to indicate that the developed application has been deployed to the distribution applications selected for deployment.

Turning to FIG. 4.9, the web page (485) displays the software available from a distribution application. The distribution application may be for cloud based deployment of the developed application and include marketing information that was submitted to the intake application.

Turning to FIG. 4.10, the web page (492) displays the software available from a another distribution application. The distribution application may be for desktop based deployment of the developed application and include marketing information that was submitted to the intake application.

Turning to FIG. 5, the process (500) implements application lifecycle management using computing systems. The process (500) may be executed by an intake application in conjunction with developer devices. Information used in the process (500) is presented using web pages and communicated with messages exchanged between the intake application and developer devices.

In Block 502, compliance information in confirmed. The intake application receives the compliance information and validates that the compliance information is sufficient. For example, the process (500) may request a country of origin and ECCN for the developed application to be identified, which may the met by receiving messages from the developer device that include the compliance information.

Blocks 504 through 514 implement a flow for validating license information. In Block 504, it is determined if the developed application has been previously published. If so, the process (500) proceeds to the Block 514. Otherwise the process (500) proceeds to the Block 508.

In Block 506, it is determined if the license information currently stored for the developed application being validated is the same as the licensing information for the previously published version of the developed application. If so, the licensing information does not need to be validated again and the process (500) proceeds to the Block 514. Otherwise, the process (500) proceeds to the Block 508.

In Block 508, licensing information is updated. In one embodiment, the licensing information is updated by receiving the licensing information as an upload from the developer device.

In Block 510, a request is generated to begin validation of the licensing information. The request may identify the licensing information that has been received for the developed application.

In Block 512, is determined whether the validation of the licensing information has passed. The determination may be made by the intake application by applying a set of rules to the licensing information to automatically determine this sufficiency of the licensing information. When the validation of the licensing information is successfully passed, the process (500) proceeds to the Block 514. If the validation is not passed, then the process (500) proceeds back to the Block 508.

In Block 514, the licensing information is validated. Validation of the licensing information may be stored by making updates to the validation information for the developed application.

Blocks 524 through 534 implement a flow for validating marketing information. In Block 524, is determined if the developed application has been previously published before proceeding with validating the marketing information. The determination made at Block 524 may be the same as the determination made at Block 504. If the developed application has been previously published, then the process (500) proceeds to the Block 526. Otherwise the process (500) proceeds to the Block 528.

In Block 526, it is determined if the marketing information currently stored for the developed application being validated is the same as the marketing information for the previously published version of the developed application. If so the marketing information does not need to be validated again and the process proceeds to the Block 534. Otherwise, the process (500) proceeds to the Block 528.

In Block 528, marketing information is updated. In one embodiment, the marketing information is updated by receiving the marketing information as an upload from the developer device.

In Block 530, a request is generated to begin validation of the marketing information. The request may identify the marketing information that has been received for the developed application.

In Block 532, it is determined whether the validation of the marketing information has passed. The termination may be made by the intake application by applying a set of rules to the marketing information to automatically determine the sufficiency of the marketing information. When the validation of the marking information is successfully passed, the process (500) proceeds to the Block 534. If the validation is not passed, then the process (500) proceeds back to the Block 528.

In Block 534, the marketing information is validated. Validation of the marketing information may be stored by making updates to the validation information for the developed application.

Blocks 544 through 560 implement a flow for testing and validating the developed application. In Block 544, a determination is made of whether another installer for the developed application is presently being tested by the intake application. For example, the developed application may be installable to multiple platforms and the platforms may be individually tested. The testing of the different platforms may be performed sequentially. In an alternative embodiment, testing of different platforms is performed in parallel. If no other installer is testing the developed application, then the process (500) proceeds to the Block 546. Otherwise the process (500) proceeds back to the Block 544 to wait until the other installer has finished testing.

In Block 546, a deployment test is requested. The request for the deployment test may identify the developed application, the application platform for the developed application, and the components for the computing system to which the developed application will be installed and tested. In response to their request, a test instance may be generated that satisfies the requirements for the computer system and onto which the developed application and the application platform are installed. The deployment test may then proceed automatically.

In Block 548, a determination is made of whether the deployment test has passed. The deployment test may identify errors and warnings. The errors may be unrecoverable and prevent the validation of the developed application. The warnings may also prevent validation of the developed application. The results of the test may be reviewed by an inspection device that provides the final determination on the validation of the deployment test of the developed application. If the deployment test is passed, then the process proceeds to the Block 552. If the employment test does not pass, then the process proceeds to the Block 550.

In Block 550, issues identified in the deployment test are resolved. In one embodiment, the issues identified in the deployment test are presented to the developer device. In response, the developer device provides an updated version of the developed application to be tested again by the intake application with the deployment test. After the updated version of the developed application is submitted, the process (500) proceeds back to the Block 546.

In Block 552, the deployment testing of the developed application is validated. Validation of the developed application by the deployment test may be stored by making updates to the validation information for the developed application.

Block 554 is a combination of Blocks 514 and 552. When Blocks 514 and 552 have been completed, the process (500) may proceed to the Block 556.

In Block 556 a request generated for performing the acceptance test on the developed application. The request may identify the developed application and may identify the test instance that was used to perform the deployment test and which may be used to perform the acceptance test. In one embodiment, an inspection device may display a remote desktop of the test instance for performance of the acceptance testing.

In Block 558 a determination is made of whether the acceptance test has been passed. The determination may be made by the intake application in response to receiving a report from an inspection device that facilitated the acceptance testing. When the acceptance test is passed, the process (500) proceeds to the Block 562. Otherwise the process proceeds to the Block 560.

In Block 560, issues identified in the acceptance test are resolved. In one embodiment, the issues identified in the acceptance test are presented 2 the developer device. In response, the developer device provides an updated version of the developed application to be tested again by the intake application. After the updated version of the developed application is submitted, the processed (500) proceeds back to the Block 556.

In Block 562, the acceptance testing of the developed application is validated. Validation of the developed application by the acceptance test may be stored by making updates to the validation information for the developed application.

Block 564 is a combination of Blocks 534 and 562. When Blocks 534 and 562 have been completed, the process (500) may proceed to the Block 566.

In Block 566, a publication request is generated. The publication request may identify the developed application and the corresponding information. The publication request may be reviewed by an inspection device that provides a response indicating whether the develop application and corresponding information are sufficient for publication. When the publication request is passed, the process (500) proceeds to the Block 572. Otherwise the process (500) proceeds to the Block 570.

In Block 570, a reconciliation is performed when the publication request is not passed. The reconciliation may involve submission of a subsequent version of the developed application and corresponding information. After reconciliation, the process (500) proceeds back to the Block 566.

In Block 572, the developed application is published. The developed application may be published to multiple distribution applications. Each of the distribution applications may receive an installer for the developed application and marketing material for the developed application. The distribution applications may then provide access to the developed application to consumption devices.

Embodiments disclosed herein may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the technology may be implemented on a node of a distributed system that is connected to other nodes. By way of another example, embodiments of the technology may be implemented on a distributed computing system having multiple nodes, where portions of the technology may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the technology.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process; or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, a single authorized process may mount the shareable segment, other than the initializing process, at any given time.

Other techniques may be used to share data, such as the various data described in the present application, between processes without departing from the scope of the technology. The processes may be part of the same or different applications and may execute on the same or different computing systems.

Rather than or in addition to sharing data between processes, the computing system performing one or more embodiments of the technology may include functionality to receive data from a user. For example, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as extensible Markup Language (XML)).

The extracted data may be used for further processing by the computing system. For example, the computing system of FIG. 6.1, while performing one or more embodiments of the technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 6.1 and the nodes and/or client device in FIG. 6.2. Other functions may be performed using one or more embodiments of the technology.

While the technology has been described with respect to a limited number of embodiments, those skilled in the art, having benefit of this disclosure, will appreciate that other embodiments may be devised which do not depart from the scope as disclosed herein. Accordingly, the scope of the technology should be limited only by the attached claims.

What is claimed is:

1. A method comprising:
   presenting, by an intake application executing on a processor, a progress bar with state information of a developed application;

validating, by the intake application, marketing information corresponding to the developed application;

updating, by the intake application, validation information, the state information, and the progress bar in response to validating the marketing information;

validating licensing information corresponding to the developed application;

updating the validation information, the state information, and the progress bar in response to validating the licensing information;

validating the developed application with a deployment test corresponding to an application platform of the developed application;

updating the validation information, the state information, and the progress bar in response to validating the developed application with a deployment test;

validating the developed application with an acceptance test responsive to updating the state information with validation of the licensing information and validation with the deployment test;

updating the validation information, the state information, and the progress bar in response to validating the developed application with an acceptance test;

generating a publication request responsive to updating the state information with validation of the developed application with the acceptance test and validation of the marketing information;

validating the publication request using the validation information; and publishing the developed application to a distribution application.

2. The method of claim 1, further comprising:
   receiving, by the intake application, prior to validating the marketing information, and prior to validating the licensing information, compliance information corresponding to the developed application;
   receiving the marketing information;
   receiving the licensing information; and
   receiving the developed application.

3. The method of claim 2, wherein the compliance information includes a trade compliance identifier, comprising an export control classification number, and an identifier of a country of origin for the developed application.

4. The method of claim 1, further comprising:
   presenting the progress bar with a plurality of indicators corresponding to the state information and validation information.

5. The method of claim 1, further comprising
   validating the developed application with the deployment test by:
   creating a test instance onto which the application platform is installed;
   installing the developed application to the test instance; and
   verifying the developed application and the application platform on the test instance are operable.

6. The method of claim 1, further comprising
   validating the developed application with the acceptance test by:
   locating a test instance onto which the application platform is installed;
   installing the developed application to the test instance;
   operating the developed application on the test instance; and
   receiving a report indicating the developed application passed the acceptance test.

7. The method of claim 1, further comprising: presenting, by the distribution application to which the developed application is published, the marketing information.

8. The method of claim 1, wherein the marketing information comprises a technical specification, a brochure, a brief, and an image stored as electronic files.

9. The method of claim 1, further comprising: distributing, by the distribution application to which the developed application is published, the developed application in accordance with the licensing information.

10. The method of claim 1, wherein the developed application processes subsurface data.

11. A system comprising:
at least one server;
an intake application stored in memory of the at least one server, executing on at least one processor of the at least one server, and configured for:
  presenting, by the intake application, a progress bar with state information of a developed application;
  validating, by the intake application, marketing information corresponding to the developed application;
  updating, by the intake application, validation information, the state information, and the progress bar in response to validating the marketing information;
  validating licensing information corresponding to the developed application;
  updating the validation information, the state information, and the progress bar in response to validating the licensing information;
  validating the developed application with a deployment test corresponding to an application platform of the developed application;
  updating the validation information, the state information, and the progress bar in response to validating the developed application with a deployment test;
  validating the developed application with an acceptance test responsive to updating the state information with validation of the licensing information and validation with the deployment test;
  updating the validation information, the state information, and the progress bar in response to validating the developed application with an acceptance test;
  generating a publication request responsive to updating the state information with validation of the developed application with the acceptance test and validation of the marketing information;
  validating the publication request using the validation information; and
  publishing the developed application to a distribution application.

12. The system of claim 11, wherein the intake application is further configured for:
  receiving, by the intake application, prior to validating the marketing information, and prior to validating the licensing information, compliance information corresponding to the developed application;
  receiving the marketing information;
  receiving the licensing information; and
  receiving the developed application.

13. The system of claim 12, wherein the compliance information includes a trade compliance identifier, comprising an export control classification number, and an identifier of a country of origin for the developed application.

14. The system of claim 11, wherein the intake application is further configured for:

presenting the progress bar with a plurality of indicators corresponding to the state information and validation information.

15. The system of claim 11, wherein the intake application is further configured for:
  validating the developed application with the deployment test by:
    creating a test instance onto which the application platform is installed;
    installing the developed application to the test instance; and
    verifying the developed application and the application platform on the test instance are operable.

16. The system of claim 11, wherein the intake application is further configured for:
  validating the developed application with the acceptance test by:
    locating a test instance onto which the application platform is installed;
    installing the developed application to the test instance;
    operating the developed application on the test instance; and
    receiving a report indicating the developed application passed the acceptance test.

17. The system of claim 11, further comprising: the distribution application configured for presenting, by the distribution application to which the developed application is published, the marketing information.

18. The system of claim 11, wherein the marketing information comprises a technical specification, a brochure, a brief, and an image stored as electronic files.

19. The system of claim 11, wherein the intake application is further configured for: distributing, by the distribution application to which the developed application is published, the developed application in accordance with the licensing information.

20. A method comprising:
  displaying a progress bar with state information of a developed application;
  transmitting, in response to interaction with a graphical user interface (GUI), compliance information of the developed application;
  transmitting marketing information of the developed application;
  displaying updates to validation information, the state information, and the progress bar in response to validation of the marketing information;
  transmitting licensing information of the developed application;
  displaying updates to the validation information, the state information, and the progress bar in response to validation of the licensing information;
  transmitting the developed application;
  displaying updates to the validation information, the state information, and the progress bar in response to validation of the developed application with a deployment test;
  displaying updates to the validation information, the state information, and the progress bar in response to validation of the developed application with an acceptance test; and
  displaying the developed application published in a distribution application.

\* \* \* \* \*